(12) United States Patent
Zhang

(10) Patent No.: US 12,546,799 B2
(45) Date of Patent: Feb. 10, 2026

(54) METHOD FOR IMPROVING CALIBRATION EFFICIENCY OF ACCELEROMETER

(71) Applicant: Institute of Geology and Geophysics, Chinese Academy of Sciences, Beijing (CN)

(72) Inventor: Xiaoxiao Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 342 days.

(21) Appl. No.: 18/152,929

(22) Filed: Jan. 11, 2023

(65) Prior Publication Data

US 2024/0192250 A1    Jun. 13, 2024

(30) Foreign Application Priority Data

Dec. 9, 2022   (CN) .......................... 202211576272.7

(51) Int. Cl.
   *G01P 21/00*   (2006.01)
   *G01P 15/08*   (2006.01)

(52) U.S. Cl.
   CPC .......... *G01P 21/00* (2013.01); *G01P 15/0802* (2013.01)

(58) Field of Classification Search
   CPC ............................ G01P 15/0802; G01P 21/00
   See application file for complete search history.

(56) References Cited

FOREIGN PATENT DOCUMENTS

| CN | 108982918 A | * | 12/2018 | .............. G01P 21/00 |
|----|-------------|---|---------|--------------------------|
| CN | 109142792 A |   | 1/2019  |                          |
| CN | 111896773 A |   | 11/2020 |                          |
| CN | 113252944 A |   | 8/2021  |                          |

* cited by examiner

*Primary Examiner* — Walter L Lindsay, Jr.
*Assistant Examiner* — Andrew V Do
(74) *Attorney, Agent, or Firm* — Nitin Kaushik

(57) ABSTRACT

The invention discloses a method for improving the calibration efficiency of an accelerometer, comprising the following steps: S100: obtaining original data of the quartz flexible accelerometer at a plurality of time nodes; S200: establishing a linear regression model according to the original data; and S300: forward predicting predicted values of performance parameters of the quartz flexible accelerometer at a plurality of target time nodes according to the linear regression model. In the solutions of the application, the establishment of the linear regression model improves the calibration efficiency of the quartz flexible accelerometer, and reduces the number of times a dedicated device is used, thus saving costs.

8 Claims, 8 Drawing Sheets

METHOD FOR IMPROVING CALIBRATION EFFICIENCY OF ACCELEROMETER

CROSS-REFERENCE TO RELATED APPLICATIONS

The application claims priority to Chinese patent application No. 202211576272.7, filed on Dec. 9, 2022, the entire contents of which are incorporated herein by reference.

TECHNICAL FIELD

The invention relates to the technical field of sensors, and in particular to a method for improving the calibration efficiency of an accelerometer.

BACKGROUND

A method for improving the calibration efficiency of an accelerometer is a core inertial sensor in an inertial navigation system, which is usually used to measure the linear acceleration of a carrier to obtain the velocity and position information of the carrier relative to a navigation coordinate system after the calculation by a navigation computer.

In related technologies, the method for improving the calibration efficiency of an accelerometer usually performs six times of rotation calibrations at four positions within a month to obtain the measured values of the performance parameters of the quartz flexible accelerometer each time. However, the quartz flexible accelerometer usually needs to be calibration tested on a dedicated device for 1 month, 3 months, 6 months, 12 months, or even longer. Therefore, it is necessary to invest in a large number of dedicated devices, resulting in high costs.

SUMMARY

The invention aims to solve at least one of the technical problems existing in the prior art. Therefore, the invention provides a method for improving the calibration efficiency of an accelerometer, the method for improving the calibration efficiency of an accelerometer according to the invention, comprises the following steps:

S100: obtaining original data of the quartz flexible accelerometer at a plurality of time nodes;

S200: establishing a linear regression model according to the original data; and S300: forward predicting predicted values of performance parameters of the quartz flexible accelerometer at a plurality of target time nodes according to the linear regression model.

The method for improving the calibration efficiency of an accelerometer according to the embodiments of the invention has at least the following beneficial effects: After the initial few months, the calibration tests of the quartz flexible accelerometer at various time nodes can be completed through the linear regression model. It can be seen from the above that the method for improving the calibration efficiency of an accelerometer in the application's solutions improves the calibration efficiency of the quartz flexible accelerometer, and reduces the number of times a dedicated device is used, thereby saving costs.

According to some embodiments of the invention, Step S300 comprises the following steps:

S310: obtaining the original data of the quartz flexible accelerometer at one current time node as variable values of the linear regression model;

S320: in combination with the linear regression model, forward predicting the predicted values of the performance parameters of the quartz flexible accelerometer at a plurality of target time nodes; and S330: cycling Steps S310 and S320 until the calibration of the quartz flexible accelerometer is completed.

According to some embodiments of the invention, Step S300 comprises the following steps:

S310: obtaining the original data in the calibration tests of the quartz flexible accelerometer;

S320: obtaining the variable values of the linear regression model by calculation through the interpolation method;

S330: in combination with the linear regression model, forward predicting the predicted values of the performance parameters of quartz flexible accelerometer at a plurality of target time nodes; and S340: cycling Steps S310, S320, and S330 until the calibration of the quartz flexible accelerometer is completed.

According to some embodiments of the invention, Step S300 further comprises the following steps:

obtaining the measured values of the performance parameters at a plurality of time nodes in Step S100, and obtaining the measured standard deviation of the performance parameters by calculation;

obtaining the data of the performance parameters at a plurality of time nodes in Step S300, and obtaining the predicted standard deviation of the performance parameters by calculation; and contrastively analyzing the measured standard deviation and the predicted standard deviation; and if the difference between them is at or above a first set value, in Step S320, reducing the number of days between adjacent time nodes, and/or reducing the number of times of prediction in Step S320.

According to some embodiments of the invention, the characteristic variables of the linear regression model at least include IDorder and Vni270du wherein IDorder is the number of days from the current target time node to a reference time node, and Vni270du is the original data generated in the calibration test of the quartz accelerometer.

According to some embodiments of the invention, the following step is further comprised prior to Step S300: verifying the accuracy of the linear regression model, which specifically comprises the following steps:

according to the original data at various time nodes in Step S100, obtaining the measured values of the performance parameters at various time nodes in Step S100 by calculation, and obtaining the measured square root of the performance parameters by calculation;

in combination with the linear regression model and the original data at various time nodes in Step S100, obtaining the predicted values of the performance parameters at various time nodes in Step S100 by calculation, and obtaining the predicted square root of the performance parameters by calculation; and contrastively analyzing the measured square root and the predicted square root; and if the difference between them is at or below a second set value, proceeding to Step S300.

According to some embodiments of the invention, Step S200 comprises the following steps:

preprocessing the original data according to the time series algorithm to obtain new characteristic variables;

eliminating a part of the characteristic variables based on the stepAIC function in R language; and establishing the linear regression model based on the multiple linear regression algorithm.

According to some embodiments of the invention, Step S200 further comprises the following step: eliminating the characteristic variables with multicollinearity according to a correlation matrix.

According to some embodiments of the invention, the method further comprises the following steps:
determining the autocorrelation of various performance parameters of the quartz flexible accelerometer, and if the autocorrelation of the performance parameters is greater than a third set value, prediction requirements are met;
wherein, in Step S300, the predicted values of the performance parameters that meet the requirements are forward predicted according to the linear regression model.

According to some embodiments of the invention, prior to determining the autocorrelation of various performance parameters of the quartz flexible accelerometer, the method further comprises the following steps:
obtaining the original data of the quartz flexible accelerometer;
preprocessing the original data according to the time series algorithm, obtaining characteristic columns, and filtering the characteristic columns; and
obtaining the autocorrelation data of various performance parameters by calculation, in combination with the autocorrelation analysis function.

Additional aspects and advantages of the invention will be given partially in the following description, some of which will become apparent from the following description or be learned from the practice of the invention.

DETAILED DESCRIPTION OF THE EMBODIMENTS

A quartz flexible accelerometer is a core inertial sensor in the inertial navigation system, which is usually used to measure the linear acceleration of a carrier to obtain the velocity and position information of the carrier relative to a navigation coordinate system after the calculation by a navigation computer. The quartz flexible accelerometer is widely applied to aerospace, aviation, sailing navigation systems, and various weapon models due to its small size, high measurement accuracy, low cost, and other advantages.

In evaluating the long-term stability of the quartz flexible accelerometer, the quartz flexible accelerometer usually needs to be continuously calibration tested on a dedicated device for 1 month, 3 months, 6 months, 12 months or even longer to measure the measured values of various performance parameters of the quartz flexible accelerometer, such as K0 (zero bias), K1 (scale factor) δ (installation error angle), K2 (quadratic nonlinear coefficient) and other performance parameters. The time interval between the time nodes of two adjacent calibration tests of the quartz flexible accelerometer is generally between 3 and 8 days. The time interval between any two adjacent time nodes can be the same, and can also be different. The time interval between the two time nodes is reasonably set according to actual situations.

Figure 1:
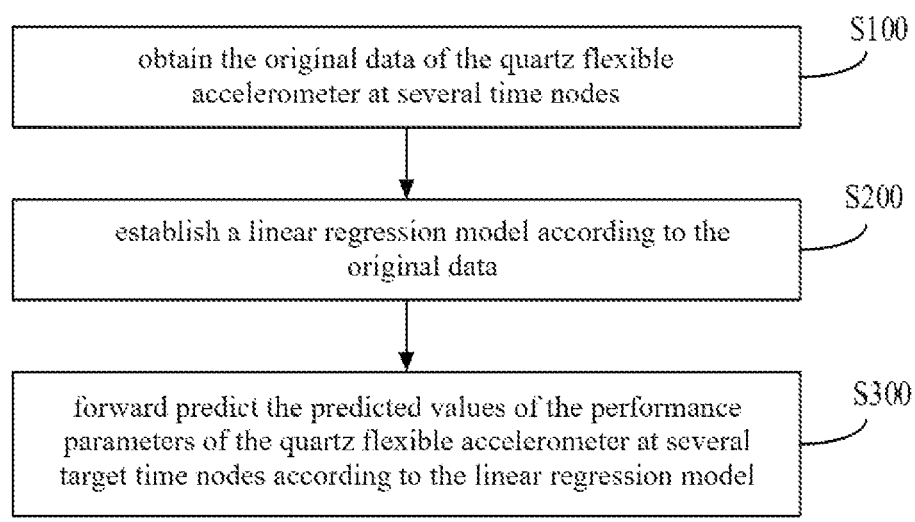
FIG. 1 is a flow diagram of a method for improving the calibration efficiency of an accelerometer in an embodiment of the invention.

The invention discloses a method for improving the calibration efficiency of an accelerometer. Referring to FIG. 1, the method comprises the following steps:
S100: obtaining original data of the quartz flexible accelerometer at a plurality of time nodes;
S200: establishing a linear regression model according to the original data; and
S300: forward predicting predicted values of performance parameters of the quartz flexible accelerometer at a plurality of target time nodes according to the linear regression model.

In Step S100, at various time nodes within the initial few months, the dedicated device is used to calibration test the quartz flexible accelerometer to obtain the original data at the corresponding time nodes. According to the original data, the measured values of the performance parameters of the quartz flexible accelerometer at various time nodes are obtained by calculation. For example, within the initial 3 months, at about 14 time nodes, it is necessary to use the dedicated device to calibration test the quartz flexible accelerometer; within the initial 6 months, at about 29 time nodes, it is necessary to use the dedicated device to calibration test the quartz flexible accelerometer. In Step S200, the linear regression model with its accuracy meeting prediction requirements is established according to the data obtained through the calibration tests within the initial 3 or 6 months. In Step S300, after the initial few months, for example, since the fourth or seventh month, the calibration tests of the quartz flexible accelerometer at various time nodes can be obtained by the calculation through the above linear regression model. To ensure the accuracy of the prediction, it is necessary to use the dedicated device to complete the calibration tests at a small part of time nodes.

To sum up, compared with the calibration tests of the quartz flexible accelerometer at various time nodes in the prior art, it is necessary to use the dedicated device to calibration test the quartz flexible accelerometer. In the application's solutions, within the initial months, it, is necessary to use the dedicated device to complete the calibration tests of the quartz flexible accelerometer at various time nodes. After the initial few months, the calibration tests of the quartz flexible accelerometer at various time nodes can be completed through the linear regression model. It can be seen from the above that the method for improving the calibration efficiency of an accelerometer in the application's solutions improves the calibration efficiency of the quartz flexible accelerometer, and reduces the number of times the dedicated device is used, thereby saving costs.

In some embodiments, the characteristic variables of the linear regression model at least include IDorder and Vni270du For example, the formula for the linear regression model is set as pred=2.267e+05+85.3−6.336e−02*IDorder+2.149e+05*Vni270du+4.167e−01*Huanzhi180du;

where pred is the predicted values of the performance parameters; IDorder is the number of days from a current target time node to a reference time node, and Vni270du and Huanzhi180du are the original data generated in the calibration tests of the quartz flexible accelerometer.

Specifically, with a time node as the reference time node, the dedicated device is used to calibration test the quartz flexible accelerometer at the reference time node to obtain the original data Vni270du and Huanzhi180du. When it is necessary to forward predict the predicted values of the performance parameters at a time node, for example, when the reference time node is February 8, the target time node is set as February 14 and IDorder is set as 6 days, the values of the above Vni270du, Huanzhi180du and IDorder are substituted into the above linear regression model to obtain the predicted values of the performance parameters on February 14 by calculation. Similarly, the target time node is set as February 18, and IDorder is set as 10 days. The values of the above Vni270du, Huanzhi180du, and IDorder are substituted into the above linear regression model to obtain the predicted values of the performance parameters on February 18.

To sum up, in the application's solutions, with a time node as the reference time node, the values of Vni270du and Huanzhi180du are obtained from the calibration test at the reference time node, thereby forward predicting the predicted values of the performance parameters at multiple target time nodes.

To verify that there is no multicollinearity in the three independent variables IDorder, Vni270du, and Huanzhi180du in the model, we use the t-test and the VIF value test (i.e. variance inflation factor) to verify.

The following are the t-test results. It can be seen that the coefficients of the three independent variables all have a pr (>|t|) of less than 0.05, so they all pass the t-test. In the following figure, the smaller the pr (>|t|) is, the more asterisks appear, which indicates that the t-test is more significant. In addition, the value of multiple $R^2$ is 0.9062, indicating that the three independent variables can contribute 90.62% of information to the accurate prediction of K0ug.

>Bmodel < -lm(k0ug~IDorder + vni270du + Huanzhi180du, data = trainfile)
>summary(Bmodel)

Call:

lm(formula = k0ug~IDorder + vni270du + Huanzhi180du, data = trainfile)

Residuals:

| Min | 1Q | Median | 3Q | Max |
|---|---|---|---|---|
| −5.4919 | −0.8217 | −0.1318 | 1.2919 | 5.1592 |

Coefficients:

| | Estimate | Std. Error | t value | Pr (>|t|) | |
|---|---|---|---|---|---|
| (Intercept) | 2.267e+05 | 6.096e+04 | 3.720 | 0.00101 | ** |
| IDorder | −6.336e−02 | 8.851e−03 | −7.159 | 1.67e−07 | *** |
| vni270du | 2.149e+05 | 5.779e+04 | 3.718 | 0.00102 | ** |
| Huanzhi180du | 4.167e−01 | 1.424e−01 | 2.927 | 0.00719 | *** |

Signif. codes: 0 '*' 0.001 '' 0.01 '*' 0.05 '.' 0.1 ' ' 1
Residual standard error: 2.299 on 25 degrees of freedom
Multiple R-squared: 0.9062, Adjusted R-squared: 0.895
F-statistic: 80.52 on 3 and 25 DF, p-value: 5.567e−13

The following is the VIF value test of the three independent variables. Their VIF values all are less than 5, indicating that there is no multicollinearity.

| > vif(Bmodel) | | |
|---|---|---|
| IDorder | vni270du | Huanzhi180du |
| 1.785655 | 2.457304 | 1.530481 |

It should be explained that the linear regression model in the application's solutions is not limited to the above form, and it is necessary to combine the original data of the quartz accelerometer in the calibration tests to establish the value model for accurately forward predicting the performance parameters of the quartz accelerometer. Therefore, the linear regression model varies with the original data in the calibration tests, and for example, pred=−0.06692*IDorder−98.42933*Vni270du.

Figure 2:
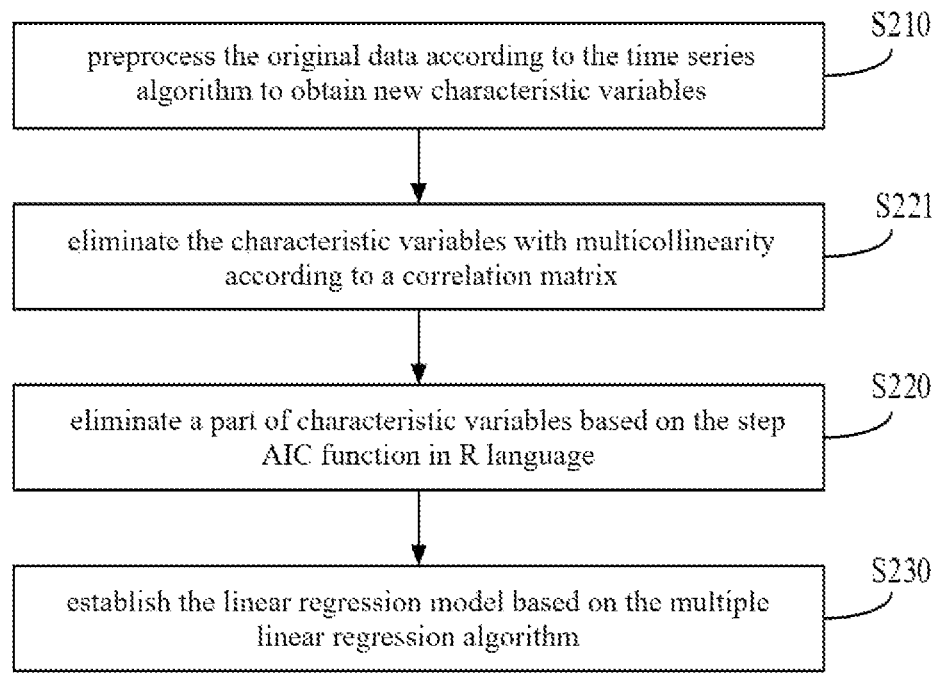
FIG. 2 is a flow diagram of Step S300 in an embodiment of the invention.

In some embodiments, referring to FIGS. 1 and 2, Step S200 comprises the following steps:

S210: preprocessing the original data according to the time series algorithm to obtain new characteristic variables;

S220: eliminating a part of the characteristic variables based on the stepAIC function in R language; and S230: establishing the linear regression model based on the multiple linear regression algorithm.

Specifically, in Step S100, the quartz flexible accelerometer is calibration tested by the dedicated device to obtain the original data at various time nodes within three or six months. In Step S210, the original data are preprocessed by using the time series algorithm to obtain the new characteristic variables. In Step S220, inappropriate characteristic variables can be eliminated automatically by using the characteristics of the stepAIC function in R language, with the remaining characteristic variables being the characteristic variables required by the model. In Step S230, the linear regression model can be established based on the multiple linear regression algorithm. The predicted values of the performance parameters at the target time nodes calculated through the linear regression models are tested to have stability not exceeding stipulations in the Specification Requirement for Accelerometers and an acceptable prediction error Further, Step S200 also comprises the following step:
S221 eliminating the characteristic variables with multicollinearity according to a correlation matrix; the step can be set between S210 and S220, and can also be set between S220 and S230.

Specifically, there is a serious multicollinearity between the characteristic variables, and the linear regression model is established through the characteristic variables with multicollinearity, so that the predicted values obtained by the calculation through the linear regression model have poor stability. Through the setting of Step S221, it can be found that there is a strong correlation between many characteristic variables. The characteristic variables with multicollinearity are eliminated, with only the characteristic variables without serious multicollinearity retained. The remaining characteristic variables all are the characteristic variables which have a strong correlation with the performance parameters but have no collinearity between each other. Therefore, Step S230 can establish an accurate linear regression model based on the multiple linear regression algorithm.

Figure 3:
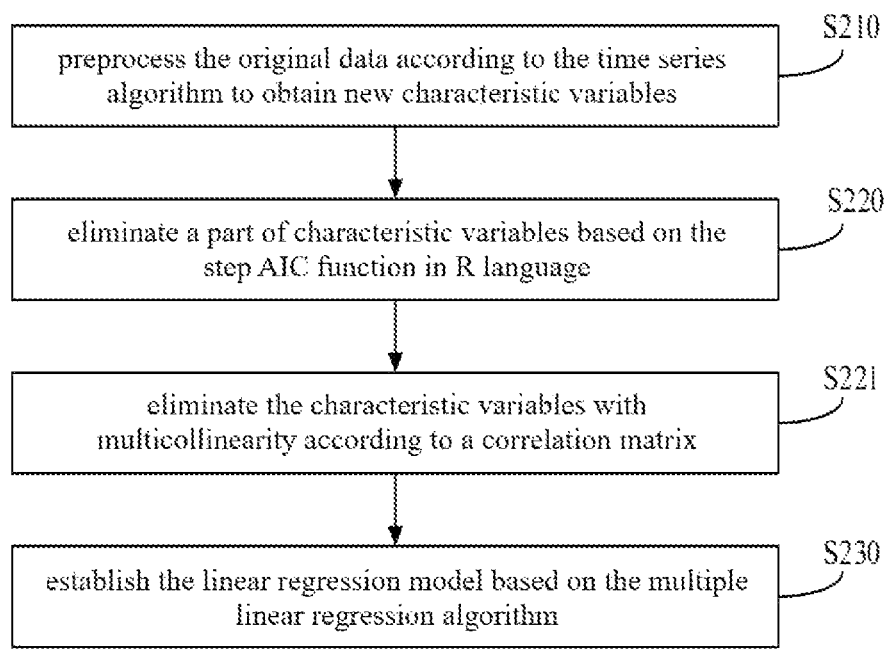
FIG. 3 is another flow diagram of Step S300 in an embodiment of the invention.

In some embodiments, referring to FIGS. 1 and 3, prior to Step S300, the following step is also comprised: verifying the accuracy of the linear regression model, which specifically comprises the following steps:

S201: according to the original data at various time nodes in Step S100, obtaining the measured values of the performance parameters at various time nodes in Step S100 by calculation, and obtaining the measured square root of the performance parameters by calculation;

S202: in combination with the linear regression model and the original data at various time nodes in Step S100, obtaining the predicted values of the performance parameters at various time nodes in Step S100 by calculation, and obtaining the predicted square root of the performance parameters by calculation; and S203: contrastively analyzing the measured square root and the predicted square root; and if the difference between them is at or below a second set value, proceeding to Step S300.

The specific analysis is as follows: Within the initial 6 months in Step S100, there are 29 time nodes set in the 6 months, and therefore 29 sets of original data are obtained through the calibration tests by using the dedicated device. According to the above 29 sets of original data, the measured values of the performance parameters at the 29 time nodes in the 6 months are obtained by calculation. In combination with the square root formula and the measured values of the above performance parameters, the measured square root of the performance parameters are obtained by calculation. Similarly, according to the values of Vni270du and Huanzhi180du in the 29 sets of original data and the value of IDorder set as 0, by using the above linear regression model, the predicted values of the performance parameters at the 29 time nodes within the 6 months are obtained by calculation. In combination with the square root formula and the predicted values of the above performance parameters, the predicted square root of the performance parameters are obtained by calculation. The measured square root and the predicted square root are contrastively analyzed, with the difference between the measured square root and the predicted square root at or below the second set value, indicating that the stability of the predicted 6-month data differs less from that of the measured 6-month data, and the linear regression model established in Step S200 meets the requirements, so that the calibration tests of the quartz flexible accelerometer in the seventh month, the eighth month, etc., can be forward predicted by using the linear regression model. On the contrary, it is necessary to readjust the linear regression model It is shown in combination with the data that in the 29 times of prediction, the deviation degrees (Column abspnct) between the predicted values and the K0 values in the measured data have a maximum of 6.49% (5.44 ug) and a minimum of 0.054% (0.05 ug). The K0 values of the measured data have a 6-month stability of 6.97 ug and the K0 values of the predicted values have a 6-month stability of 6.636 ug, with a deviation of 0.334 ug, which differs greatly from the 6-month K0 stability index requirement of 15 ug for the quartz flexible accelerometer. Therefore, the predicted values can be used to evaluate the long-term stability of the quartz flexible accelerometer.

Similarly, for K1 and δ, the same method can also be used to train the model and predict the long-term stability.

| G | H | I | J | K | L |
|---|---|---|---|---|---|
| The mean value of K0 ug | The squared value of (pred minus mean value of K0 ug) | The sum of column H | A total of 29 sets of datas | The value of column I divided by column J | The square root of column K |

| A | B K0 ug | C pred | D diff | E absdiff | F abspcnt | G The mean value of K0 ug | H The squared value of (pred minus mean value of K0 ug) | I The sum of column H | J A total of 29 sets of datas | K The value of column I divided by column J | L The square root of column K |
|---|---|---|---|---|---|---|---|---|---|---|---|
| 1 | 106.19 | 100.9844 | 5.205602 | 5.205602 | 0.049022 | 95.9 | 25.85110302 | 1277.2 | 29 | 44.04138 | 6.636368 |
| 2 | 104.07 | 99.91916 | 4.150844 | 4.150844 | 0.039885 | 95.9 | 16.15361495 | | | | |
| 3 | 101.19 | 101.4029 | −0.21289 | 0.212894 | 0.002104 | 95.9 | 30.28184238 | | | | |
| 4 | 98.8 | 98.85385 | −0.05385 | 0.053848 | 0.000545 | 95.9 | 8.725218007 | | | | |
| 5 | 98.5 | 99.05049 | −0.55049 | 0.55049 | 0.005589 | 95.9 | 9.92558724 | | | | |
| 6 | 98.29 | 98.69259 | −0.40259 | 0.402594 | 0.004096 | 95.9 | 7.798581249 | | | | |
| 7 | 103.57 | 105.4554 | −1.8854 | 1.885395 | 0.018204 | 95.9 | 91.30557361 | | | | |
| 8 | 112.41 | 111.7011 | 0.708864 | 0.708864 | 0.006306 | 95.9 | 249.6758989 | | | | |
| 9 | 102.33 | 104.4205 | −2.09054 | 2.090542 | 0.020429 | 95.9 | 72.59963597 | | | | |
| 10 | 98.97 | 101.5526 | −2.58264 | 2.582636 | 0.026095 | 95.9 | 31.95229375 | | | | |
| 11 | 101.51 | 101.0749 | 0.435077 | 0.435077 | 0.004286 | 95.9 | 26.77982806 | | | | |
| 12 | 100.99 | 101.1212 | −0.13116 | 0.13116 | 0.001299 | 95.9 | 27.26051175 | | | | |
| 13 | 99.53 | 100.3056 | −0.7756 | 0.775595 | 0.007793 | 95.9 | 19.4092673 | | | | |
| 14 | 99.28 | 100.1181 | −0.83806 | 0.838056 | 0.008441 | 95.9 | 17.79199642 | | | | |
| 15 | 95.76 | 96.4974 | −0.7374 | 0.737401 | 0.007701 | 95.9 | 0.356887955 | | | | |
| 16 | 97.07 | 97.15563 | −0.08563 | 0.085632 | 0.000882 | 95.9 | 1.576611719 | | | | |
| 17 | 95.5 | 94.75009 | 0.749913 | 0.749913 | 0.007852 | 95.9 | 1.322299908 | | | | |
| 18 | 94.21 | 93.06765 | 1.142347 | 1.142347 | 0.012126 | 95.9 | 8.022189529 | | | | |
| 19 | 89.97 | 90.29335 | −0.32335 | 0.323348 | 0.003594 | 95.9 | 31.43454665 | | | | |

| A | B<br>K0 ug | C<br>pred | D<br>diff | E<br>absdiff | F<br>abspcnt | G<br>The mean value of K0 ug | H<br>The squared value of (pred minus mean value of K0 ug) | I<br>The sum of column H | J<br>A total of 29 sets of datas | K<br>The value of column I divided by column J | L<br>The square root of column K |
|---|---|---|---|---|---|---|---|---|---|---|---|
| 20 | 83.89 | 89.33519 | −5.44519 | 5.445192 | 0.064909 | 95.9 | 43.09670408 | | | | |
| 21 | 86.16 | 88.00851 | −1.84851 | 1.848514 | 0.021454 | 95.9 | 62.27555129 | | | | |
| 22 | 82.77 | 86.78099 | −4.01099 | 4.010991 | 0.048459 | 95.9 | 83.15632514 | | | | |
| 23 | 92.5 | 90.47523 | 2.024775 | 2.024775 | 0.021889 | 95.9 | 29.4281838 | | | | |
| 24 | 92.24 | 90.15002 | 2.089985 | 2.089985 | 0.022658 | 95.9 | 33.0623275 | | | | |
| 25 | 91.55 | 89.48926 | 2.060744 | 2.060744 | 0.022509 | 95.9 | 41.09763863 | | | | |
| 26 | 88.67 | 88.21625 | 0.453748 | 0.453748 | 0.005117 | 95.9 | 59.03998333 | | | | |
| 27 | 89.37 | 87.95022 | 1.419783 | 1.419783 | 0.015887 | 95.9 | 63.19904975 | | | | |
| 28 | 88.12 | 86.58162 | 1.538376 | 1.538376 | 0.017458 | 95.9 | 86.83213128 | | | | |
| 29 | 87.35 | 86.0113 | 1.338705 | 1.338705 | 0.015326 | 95.9 | 97.78648658 | | | | |

The calculation data and structure are shown in the above figure, where K0ug is the true value of K0, and pred is the predicted value based on the original data. Since there are only 29 small samples in the linear regression, train data can be used to test the prediction accuracy.

Duff is the difference of K0ug minus pred;

absdiff is the absolute value of duff;

abspnct is the absolute value of {(true value−predicted value)/true value}(the absolute value of open parenthesis true value minus predicted value close parenthesis divided by true value), that is, the deviation degree;

The mean value of K0ug: average value for K0ug

The squared value of (pred minus mean value of K0ug): the square of the difference of predicted value and K0ug mean value. To determine how much the difference between pred and K0 mean value are;

The sum of column H: the square sum of pred minus K0ug mean value;

A total of 29 sets of datas: the total number of measured values, there are 29 measured values;

The value of column I divided by column J: first open parenthesis pred minus K0ug mean value close parenthesis squared, then summed, and finally divided by the number of measured values, that is, the average variance;

The square root of column K: find the square root of the value of column I divided by column J (average variance), and the calculation result is the 6-month K0 stability value (i.e., 1σ) of the predicted data, 6.636368, while the 6-month K0 stability value (1σ in Column B) of the measured data, 6.970757674.

Figure 4:
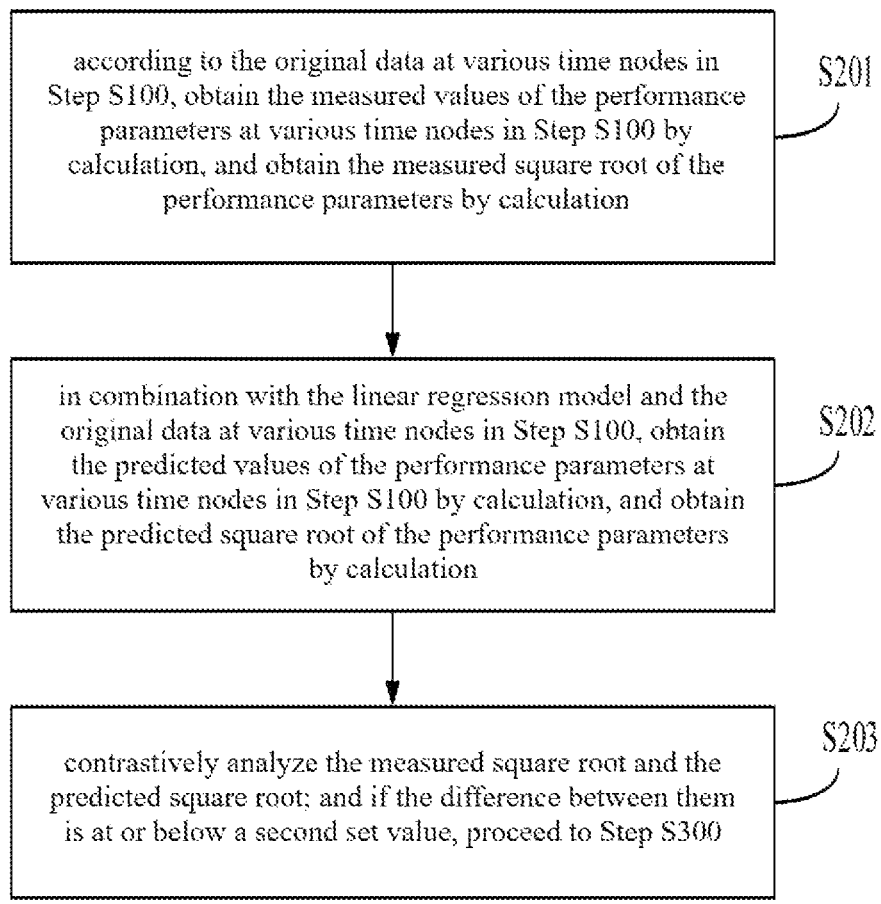
FIG. 4 is an adjusted flow diagram of Step S300 in an embodiment of the invention.

In some embodiments, referring to FIGS. 1 and 4, Step S300 comprises the following steps:

S310: obtaining the original data of the quartz flexible accelerometer at the current time node;

S320: in combination with the linear regression model and the original data obtained in Step S310, forward predicting the predicted values of the performance parameters of the quartz flexible accelerometer at a plurality of target time nodes; and S330: cycling Steps S310 and S320 until the calibration of the quartz flexible accelerometer is completed.

The specific analysis in combination with examples is as follows: referring to the following table, February 8 is set as the first time node which is also the reference time node. At the first time node, the quartz flexible accelerometer is calibration tested by using the dedicated device to obtain the measured values (the original data) of Vni270du and Huanzhi180du, with IDorder set as 0.

February 14 is set as the second time node, and the data of Vni270du and Huanzhi180du are the original data at the first time node, with IDorder set as 6 days; the data of Vni270du, Huanzhi180du, and IDorder are substituted into the above linear regression model to obtain the predicted values of the performance parameters at the time node by calculation; wherein the performance parameters can be K0, K1, and δ (K2 in the table).

February 18 is set as the third time node, and the data of Vni270du and Huanzhi180du are the original data at the first time node, with IDorder set as 10 days; the data of Vni270du, Huanzhi180du, and IDorder are substituted into the above linear regression model to obtain the predicted values of the performance parameters at the time node by calculation; wherein the performance parameters can be K0, K1, and δ (K2 in the table).

February 22 is set as the fourth time node, and the data of Vni270du and Huanzhi180du are the original data at the first time node, with IDorder set as 14 days; the data of Vni270du, Huanzhi180du, and IDorder are substituted into the above linear regression model to obtain the predicted values of the performance parameters at the time node by calculation; wherein the performance parameters can be K0, K1, and δ (K2 in the table).

The above steps are cycled as follows:

February 28 is set as the fifth time node which is also the reference time node, and the quartz flexible accelerometer is calibration tested by using the dedicated device to obtain the measured values of Vni270du and Huanzhi180du, with IDorder set as 0.

March 5 is set as the sixth time node, and the data of Vni270du and Huanzhi180du are the original data at the fifth time node, with IDorder set as 5 days; the measured values of Vni270du, Huanzhi180du, and IDorder are substituted into the above linear regression model to obtain the predicted values of the performance parameters at the time node by calculation; wherein the performance parameters can be K0, K1, and δ (K2 in the table).

March 10 is set as the seventh time node, and the data of Vni270du and Huanzhi180du are the original data at the fifth time node, with IDorder set as 10 days; the data of Vni270du, Huanzhi180du, and IDorder are substituted into the above linear regression model to obtain the predicted values of the performance parameters at the time node by calculation; wherein the performance parameters can be K0, K1, and δ (K2 in the table).

March 16 is set as the eighth time node, and the data of Vni270du and Huanzhi180du are the original data at the fifth time node, with IDorder set as 16 days; the data of Vni270du, Huanzhi180du, and IDorder are substituted into the above linear regression model to obtain the predicted values of the performance parameters at the time node by calculation; wherein the performance parameters can be K0, K1, and δ (K2 in the table).

The above steps are cycled until the 29th time node (referring to the following table).

| K0 ug | DiffDays | Date | IDorder | Vni270du | Huanzhi180du | order | Comments |
|---|---|---|---|---|---|---|---|
| 106.19 | 0 | 2022 Feb. 8 18:00 | 0 | −1.05484 | 0.09 | 1 | Start the test on February 8 |
| 104.07 | 6 | 2022 Feb. 14 19:19 | 6 | −1.05484 | 0.09 | 1 | Vni270du and Huazhi180du remain unchanged |
| 101.19 | 4 | 2022 Feb. 18 17:00 | 10 | −1.05484 | 0.09 | 1 | Vni270du and Huazhi180du remain unchanged |
| 98.8 | 4 | 2022 Feb. 22 18:14 | 14 | −1.05484 | 0.09 | 1 | Vni270du and Huazhi180du remain unchanged |
| 98.5 | 6 | 2022 Feb. 28 16:18 | 20 | −1.05484 | 1.77 | 2 | again perform actually the test one time |
| 98.29 | 5 | 2022 Mar. 5 11:54 | 25 | −1.05484 | 1.77 | 2 | Vni270du and Huazhi180du remain unchanged |
| 103.57 | 5 | 2022 Mar. 10 18:31 | 30 | −1.05484 | 1.77 | 2 | Vni270du and Huazhi180du remain unchanged |
| 112:41 | 6 | 2022 Mar. 16 11:26 | 36 | −1.05484 | 1.77 | 2 | Vni270du and Huazhi180du remain unchanged |
| 102.33 | 6 | 2022 Mar. 22 15:34 | 42 | −1.05482 | 7.43 | 3 | again perform actually the test one time |
| 98.97 | 6 | 2022 Mar. 28 11:51 | 48 | −1.05482 | 7.43 | 3 | Vni270du and Huazhi180du remain unchanged |
| 101.51 | 5 | 2022 Apr. 2 21:06 | 53 | −1.05482 | 7.43 | 3 | Vni270du and Huazhi180du remain unchanged |
| 100.99 | 6 | 2022 Apr. 8 11:21 | 59 | −1.05482 | 7.43 | 3 | Vni270du and Huazhi180du remain unchanged |
| 99.53 | 6 | 2022 Apr. 14 15:23 | 65 | −1.05483 | 4.92" | 4 | again perform actually the test one time and |
| 99.28 | 6 | 2022 Apr. 20 15:05 | 71 | −1.05483 | 4.92 | 4 | Vni270du and Huazhi180du remain unchanged |
| 95.76 | 6 | 2022 Apr. 26 17:55 | 77 | −1.05483 | 4.92 | 4 | Vni270du and Huazhi180du remain unchanged |
| 97.07 | 6 | 2022 May 2 19:52 | 83 | −1.05483 | 4.92 | 4 | Vni270du and Huazhi180du remain unchanged |
| 95.5 | 25 | 2022 May 27 12:34 | 108 | −1.05484 | 2.52 | 5 | again perform actually the test one time |
| 94.21 | 20 | 2022 Jun. 9 16:30 | 128 | −1.05484 | 2.52 | 5 | Vni270du and Huazhi180du remain unchanged |
| 89.97 | 6 | 2022 Jun. 13 17:11 | 134 | −1.05484 | 2.52 | 5 | Vni270du and Huazhi180du remain unchanged |
| 83.89 | 4 | 2022 Jun. 17 17:43 | 138 | −1.05484 | 2.52 | 5 | Vni270du and Huazhi180du remain unchanged |
| 86.16 | 7 | 2022 Jun. 24 10:12 | 145 | −1.05486 | 0.91 | 6 | again perform actually the test one time |
| 82.77 | 3 | 2022 Jun. 27 22:18 | 148 | −1.05486 | 0.91 | 6 | Vni270du and Huazhi180du remain unchanged |
| 92.5 | 17 | 2022 Jul. 14 13:01 | 165 | −1.05486 | 0.91 | 6 | Vni270du and Huazhi180du remain unchanged |

-continued

| K0 ug | DiffDays | Date | IDorder | Vni270du | Huanzhi180du | order | Comments |
|---|---|---|---|---|---|---|---|
| 92.24 | 7 | 2022 Jul. 21 10:36 | 172 | −1.05486 | 0.91 | 6 | Vni270du and Huazhi180du remain unchanged |
| 91.55 | 6 | 2022 Jul. 25 10:36 | 178 | −1.05486 | 0.91 | 7 | again · perform actually the test one time |
| 88.67 | 2 | 2022 Jul. 27 16:19 | 180 | −1.05485 | 3.11 | 7 | Vni270du and Huazhi180du remain unchanged |
| 89.37 | 5 | 2022 Aug. 1 9:43 | 185 | −1.05485 | 3.11 | 7 | Vni270du and Huazhi180du remain unchanged |
| 88.12 | 4 | 2022 Aug. 5 11:02 | 189 | −1.05485 | 3.11 | 7 | Vni270du and Huazhi180du remain unchanged |
| 87.35 | 5 | 2022 Aug. 10 10:11 | 194 | −1.05485 | 3.11 | 7 | Vni270du and Huazhi180du remain unchanged |

29 predicted values are obtained through the above method, and the results are shown in the following table: that is, the error is 10.76%, indicating that the accuracy is about 90%.

| | K0 ug | pred | diff | absdiff | abspcnt | The mean value of K0 |
|---|---|---|---|---|---|---|
| 1 | 106.19 | 100.9844 | 5.205602 | 5.205602 | 0.049022 | 95.9 |
| 2 | 104.07 | 100.6042 | 3.465762 | 3.465762 | 0.033302 | 95.9 |
| 3 | 101.19 | 100.3508 | 0.839202 | 0.839202 | 0.008293 | 95.9 |
| 4 | 98.8 | 100.0974 | −1.29736 | 1.297358 | 0.013131 | 95.9 |
| 5 | 98.5 | 99.05049 | −0.55049 | 0.55049 | 0.005589 | 95.9 |
| 6 | 98.29 | 98.73369 | −0.44369 | 0.44369 | 0.004514 | 95.9 |
| 7 | 103.57 | 98.41689 | 5.15311 | 5.15311 | 0.049755 | 95.9 |
| 8 | 112.41 | 98.03673 | 14.37327 | 14.37327 | 0.127865 | 95.9 |
| 9 | 102.33 | 104.4205 | −2.09054 | 2.09054 | 0.020429 | 95.9 |
| 10 | 98.97 | 104.0404 | −5.07038 | 5.070382 | 0.051232 | 95.9 |
| 11 | 101.51 | 103.7236 | −2.21358 | 2.213582 | 0.021807 | 95.9 |
| 12 | 100.99 | 103.3434 | −2.35342 | 2.35342 | 0.023304 | 95.9 |
| 13 | 99.53 | 100.3056 | −0.77559 | 0.775595 | 0.007793 | 95.9 |
| 14 | 99.28 | 99.92543 | −0.64543 | 0.645435 | 0.006501 | 95.9 |
| 15 | 95.76 | 99.54527 | −3.78527 | 3.785275 | 0.039529 | 95.9 |
| 16 | 97.07 | 99.16511 | −2.09511 | 2.095115 | 0.021584 | 95.9 |
| 17 | 95.5 | 94.75009 | 0.749913 | 0.749913 | 0.007852 | 95.9 |
| 18 | 94.21 | 93.48289 | 0.727113 | 0.727113 | 0.007718 | 95.9 |
| 19 | 89.97 | 93.10273 | −3.13273 | 3.132727 | 0.03482 | 95.9 |
| 20 | 83.89 | 92.84929 | −8.95929 | 8.959287 | 0.106798 | 95.9 |
| 21 | 86.16 | 88.00851 | −1.84851 | 1.848514 | 0.021454 | 95.9 |
| 22 | 82.77 | 87.81843 | −5.04843 | 5.048434 | 0.060994 | 95.9 |
| 23 | 92.5 | 86.74131 | 5.758686 | 5.758686 | 0.062256 | 95.9 |
| 24 | 92.24 | 86.29779 | 5.942206 | 5.942206 | 0.064421 | 95.9 |
| 25 | 91.55 | 85.91763 | 5.632366 | 5.632366 | 0.061522 | 95.9 |
| 26 | 88.67 | 88.21625 | 0.453748 | 0.453748 | 0.005117 | 95.9 |
| 27 | 89.37 | 87.89945 | 1.470548 | 1.470548 | 0.016455 | 95.9 |
| 28 | 88.12 | 87.64601 | 0.473988 | 0.473988 | 0.005379 | 95.9 |
| 29 | 87.35 | 87.32921 | 0.020788 | 0.020788 | 0.000238 | 95.9 |
| long-term stability(10) | 6.208725 | 6.970758 | | | | |

Figure 5:
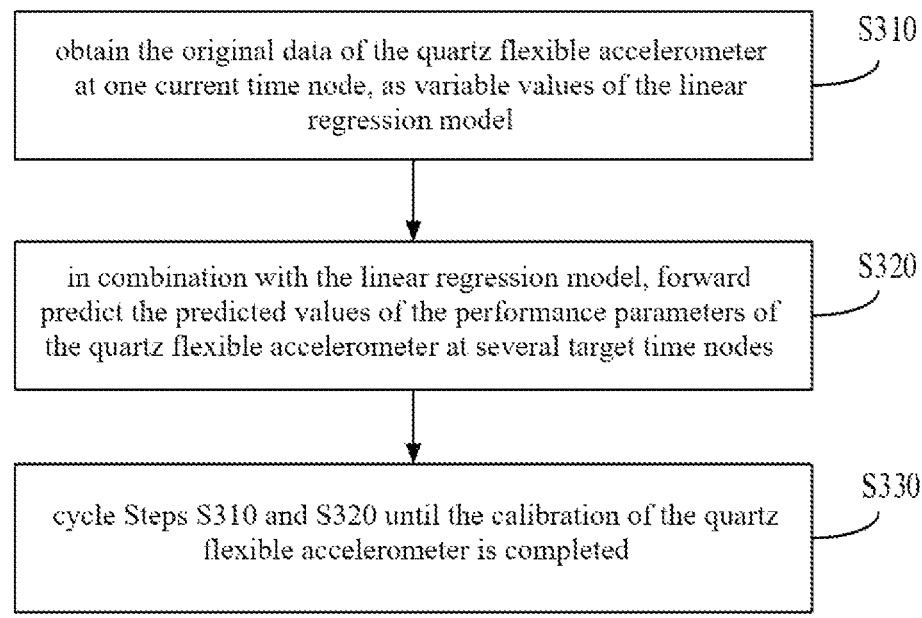
FIG. 5 is a flow diagram for determining the accuracy of a linear regression model in an embodiment of the invention.

It can be seen from the above table that the data obtained from one time of actual calibration test every three times of calibration (the time interval between two adjacent times of calibration is about 6 days, and the time interval between the fourth time of calibration and the first time of calibration) are used to calculate the forward prediction results. The predicted 6-month K0 stability is 6.209 ug, and the actual stability is 6.97 ug, with the difference between them is 0.761 ug which accounts for 10.91% of the actual stability, In some embodiments, referring to FIGS. 1 and 5, instead of Step S300 above, Step S300 comprises the following steps:

S310: obtaining the original data of the quartz flexible accelerometer in the calibration tests;

S320: obtaining variable values of the linear regression model by calculation through the interpolation method;

S330: in combination with the linear regression model, forward predicting the predicted values of the performance parameters of quartz flexible accelerometer at a plurality of target time nodes; and S340: cycling Steps S310, S320, and S330 until the calibration of the quartz flexible accelerometer is completed.

The specific analysis is as follows: In calculating the predicted values of the performance parameters at the target time node, the original data in the calibration tests are directly applied to the above linear regression model to obtain the predicted values of the performance parameters. Instead of the above solution, the interpolation method is used to calculate the variable values at various target time nodes. Obviously, the obtained variable values by calculation are used as the variable values of the linear regression model, so that the linear regression model can more accurately predict the predicted values of the performance parameters.

Figure 6:
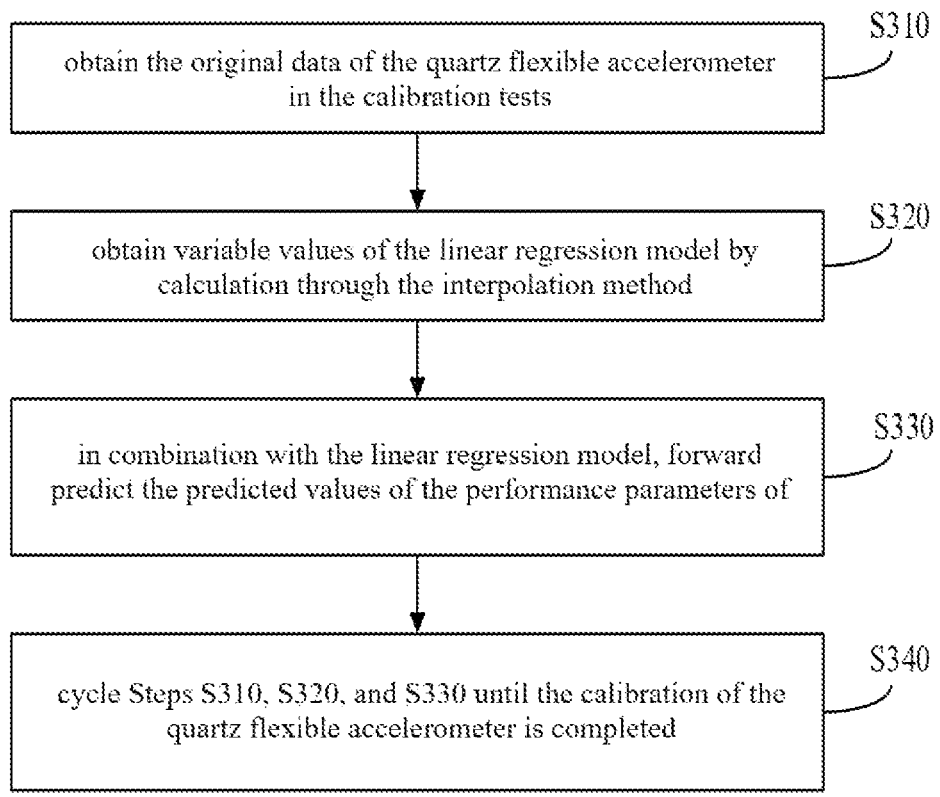
FIG. 6 is a flow diagram of Step S200 in an embodiment of the invention.

In some embodiments, referring to FIGS. 1 and 6, Step S300 also includes the following steps:

S301: obtaining the measured values of the performance parameters at a plurality of time nodes in Step S100, and obtaining the measured standard deviation of the performance parameters by calculation;

S302: obtaining the data of the performance parameters at a plurality of time nodes in Step S300, and obtaining the predicted standard deviation of the performance parameters by calculation, wherein at least a part of the data of the performance parameters are the predicted values; and S303: contrastively analyzing the measured standard deviation and the predicted standard deviation; and if the difference between them is at or above the first set value, in Step S320, reducing the number of days between adjacent time nodes, and/or reducing the number of times of prediction in Step S320.

The specific analysis is as follows: Within the initial 6 months in Step S100, there are 29 time nodes set in the 6 months. According to the six consecutive sets of original data, the measured values of the performance parameters at the six time nodes are obtained by calculation. In combination with the standard deviation formula and the measured values of the above performance parameters, the measured standard deviation of the above performance parameters is obtained by calculation. Similarly, in Steps S310 to S330, the data of performance parameters at six time nodes are obtained by calculation. Since the method of measuring one time to calculate three times is adopted, at least one of six times of the data of the performance parameters are the measured values of the performance parameters. In combination with the standard deviation formula and the predicted values of the above performance parameters, the predicted standard deviation of the above performance parameters are obtained by calculation. The measured standard deviation and the predicted standard deviation are contrastively analyzed; the difference between them at or above the first set value indicates that the stability of predicted values differs greatly from that of measured values, it is necessary to reduce the number of days between adjacent time nodes, and/or reduce the number of times of prediction in Step S320, thereby improving the accuracy of the predicted values of the performance parameters. On the contrary, there is no need to adjust the number of times of prediction or the number of interval days.

In the above description, the starting time period is set as six months, and the linear regression model is established according to the original data in the calibration tests of the quartz flexible accelerometer within six months. In the subsequent time periods, the linear regression model can be used to forward predict the values of the performance parameters of the quartz flexible accelerometer at the target time nodes. It should be explained that the starting time period is not necessarily set as six months. For example, the starting time period is set as three months, and the linear regression model is established according to the original data in the calibration tests of the quartz flexible accelerometer within the three months. In the three subsequent months, the values of the performance parameters of the quartz flexible accelerometer at the target time nodes within the three subsequent months can be forward predicted through the linear regression model. The specific analysis is as follows:

At various time nodes within the first three months, the quartz flexible accelerometer is calibration tested by using the dedicated device, wherein the time interval between adjacent time nodes is between 5 and 6 days, and a total of 16 time nodes are set within the three months. The dedicated device calibration tests the quartz flexible accelerometer to obtain 16 sets of original data, and a linear regression model (regression mathematical formula) is trained according to the above 16 sets of original data.

At the first time node within the next three months, the dedicated device is used to calibration test the quartz flexible accelerometer to measure the original data of the quartz flexible accelerometer at the first time node. At various time nodes (target time nodes) following the first time node, the values of the performance parameters of the quartz flexure accelerometer at the various time nodes are predicted according to the original data (Vni270du) at the first time node, IDorder (the number of days from the current target time node to the first time node), and the linear regression model. For example, after the first time node, the values of the performance parameters of the quartz flexible accelerometer at the four subsequent time nodes are predicted. By analogy, at a time node (the sixth time node in the next three months), the dedicated device is used to calibration test the quartz flexible accelerometer to measure the original data of the quartz flexible accelerometer at the time node. At multiple time nodes (target time nodes) following the time node, the values of the performance parameters of the quartz flexible accelerometer at the various time nodes are predicted according to the original data (Vni270du) at the time node (the sixth time node in the next three months), IDorder (the number of days from the current target time node to the sixth time node) and the linear regression model. For example, after the sixth time node, the values of the performance parameters of the quartz flexible accelerometer at the seven subsequent time nodes are predicted, with the period of the next three months just ending.

To sum up, in the first aspect, the application's solutions can save a lot of actual measurement costs, especially after the third month, there is a total of 13 times of measurement required, there are only 2 times of measurement actually required, and the other 11 times of measurement are predicted through the linear regression function; in the second aspect, the application's solutions can reduce the measurement period, there are 6 months originally required for measurement, but there are now only 2 times of measurement required, and the actual measurement period can be reduced by about 1.5-2 months (for a 6-month stability test). For a one-year stability test, the actual measurement period can be reduced by 3-4 months.

In some embodiments, in Step S300, the predicted values of the performance parameters of the quartz flexible accelerometer are forward predicted according to the linear regression model until the calibration test of the quartz flexible accelerometer is completed.

The specific analysis is as follows: There are two time periods included for the calibration test of the quartz flexible accelerometer, which are respectively the first time period and the second time period. At various time nodes in the first time period, in Step S100, the dedicated device is used to calibration test the quartz flexible accelerometer to obtain the measured values of the performance parameters by calculation; at various time nodes in the second time period, in Step S300, the predicted values of the performance parameters of the quartz flexible accelerometer are predicted by using the linear regression model. Finally, in combination with the measured values of the performance parameters in the first time period and the predicted values of the performance parameters in the second time period, the stability of the quartz flexible accelerometer is demonstrated. For example, in the prior art, within one year, the quartz flexible accelerometer needs to be calibration tested by using the dedicated device from January to December. In the application's solutions, the quartz flexible accelerometer needs to be calibration tested only from January to October (the first time period) by using the dedicated device; and the values of the performance parameters of the quartz flexible accelerometer can be predicted from November to December (the second time period) by using the linear regression model. It can be seen from the above that in the application's solutions, the one-year stability of the quartz flexible accelerometer can be verified by using the dedicated device to calibration test the quartz flexible accelerometer only for 10 months. For another example, within half a year, the application's solutions need to use the dedicated device to calibration test the quartz flexible accelerometer only from January to April (the first time period), and the linear regression model can be used to predict the values of the performance parameters of the quartz flexible accelerometer from May to June (the second time period). It can be seen from the above that in the application's solutions, the half-a-year stability of the quartz flexible accelerometer can be verified by using the dedicated device to calibration test the quartz flexible accelerometer only for 4 months.

Figure 7:
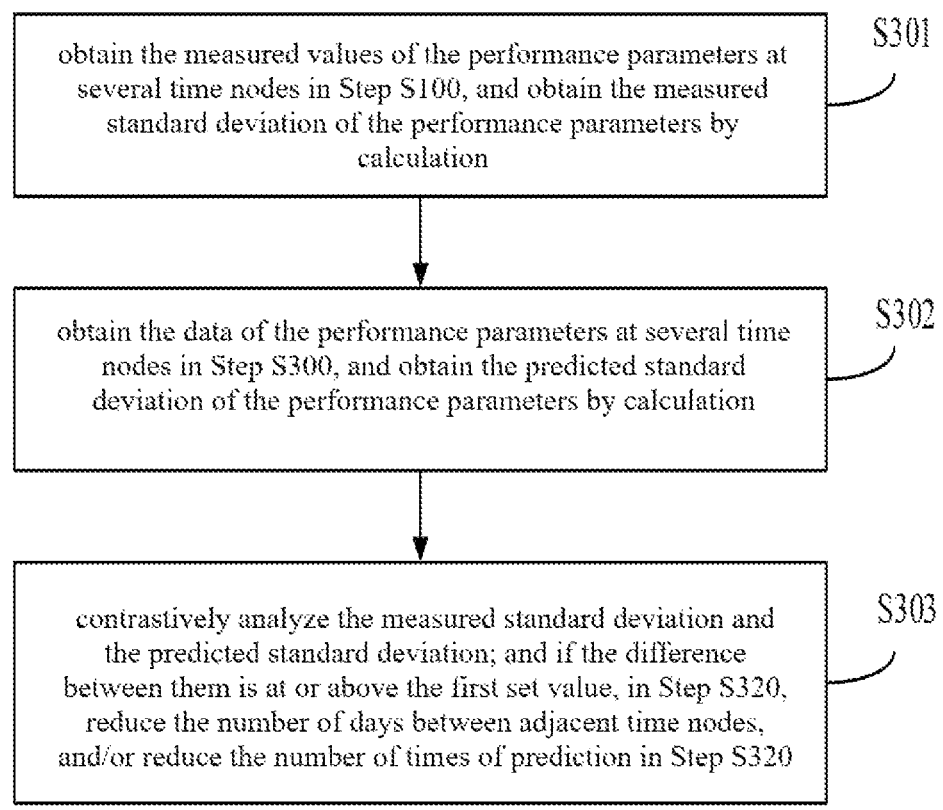
FIG. 7 is a flow diagram for determining the autocorrelation of performance parameters in an embodiment of the invention.
Figure 8:
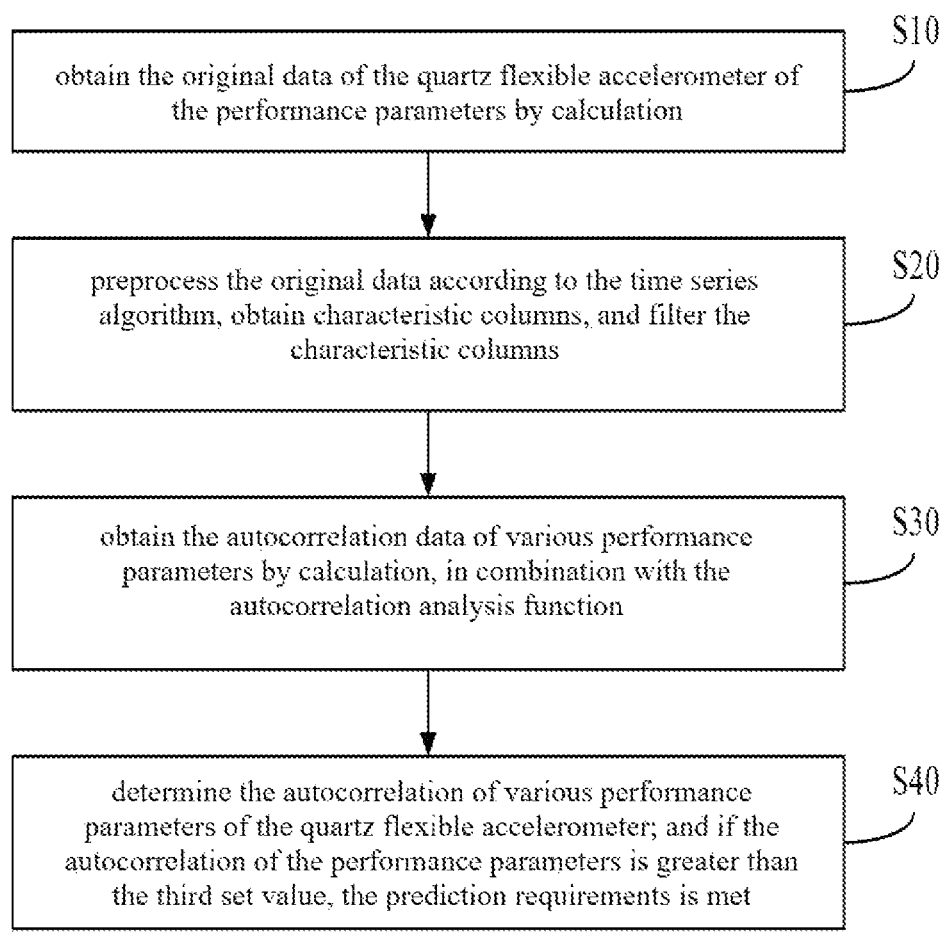

In some embodiments, referring to FIGS. 1 and 7, there are also the following steps included prior to Step S100: determining the autocorrelation of various performance parameters of the quartz flexible accelerometer; and if the autocorrelation of the performance parameters is greater than a third set value, the prediction requirements being met; wherein, in Step S300, the predicted values of the performance parameters meeting the requirements are forward predicted according to the linear regression model.

Specifically, various performance parameters are respectively K0 (zero bias), K1 (scale factor), δ (installation error angle), and K2 (quadratic nonlinear coefficient), etc., and through the autocorrelation analysis of K0 (zero bias), K1 (scale factor), δ (installation error angle) and K2 (quadratic nonlinear coefficient), their autocorrelations are 77.9%, 65.6%, 18.3%, and 86.6%, respectively. In addition, due to the first set value of between 30% and 50%, K0, K1, and δ meet the prediction requirements. Since the parameters K0, K1, and δ meet the prediction requirements, in Step S200, the linear regression model is established only for K0, K1, and δ (K3), and the predicted values of the performance parameters of the quartz flexible accelerometer are forward predicted according to the linear regression model.

The further analysis is as follows: before the steps are combined with the autocorrelation analysis function, the following steps are also included:

S10: obtaining the original data of the quartz flexible accelerometer;

S20: preprocessing the original data according to the time series algorithm, obtaining characteristic columns, and filtering the characteristic columns;

S30: obtaining the autocorrelation data of various performance parameters by calculation, in combination with the autocorrelation analysis function;

S40: determining the autocorrelation of various performance parameters of the quartz flexible accelerometer; and if the autocorrelation of the performance parameters is greater than the third set value, the prediction requirements being met.

The specific analysis is as follows: for Step S10 and Step S20, the following table is referred to:

| Characteristic title | Commentary | Unit |
| --- | --- | --- |
| K0ug | K0 (ug) | (ug) |
| K0uglag | K0 (ug) at last time | (ug) |
| K1mA.g | K1(mA/g) | (mA/g) |
| K1mA.glag | K1(mA/g) at last time | (mA/g) |
| K2ug.g2 | K2(ug/g2) | (ug/g2) |
| K2ug.g2lag | K2(ug/g2) at last time | (ug/g2) |
| K3urad (δ) | K3(urad) | (urad) |
| K3uradlag | K3(urad) at last time | (urad) |
| Idorder | the number of cumulative days from each time of test after the first time of test to the first time of test | the number of days |
| diffDays | the number of days between each time of test and the last time of test | the number of days |
| Vshun0du | original data: the output voltage value of the accelerometer at 0° clockwise rotation | V(volt) |
| Vshun90du | original data: the output voltage value of the accelerometer at 90° clockwise rotation | V(volt) |
| Vshun180du | original data: the output voltage value of the accelerometer at 180° clockwise rotation | V(volt) |
| Vshun270du | original data: the output voltage value of the accelerometer at 270° clockwise rotation | V(volt) |
| Vni0du | original data: the output voltage value of the accelerometer at 0° counterclockwise rotation | V(volt) |
| Vni90du | original data: the output voltage value of the accelerometer at 90° counterclockwise rotation | V(volt) |

-continued

| Characteristic title | Commentary | Unit |
| --- | --- | --- |
| Vni180du | original data: the output voltage value of the accelerometer at 180° counterclockwise rotation | V(volt) |
| Vni270du | original data: the output voltage value of the accelerometer at 270° counterclockwise rotation | V(volt) |
| Huanzhi0du | original data: the output hysteresis voltage value of the accelerometer at 0° | V(volt) |
| Huanzhi90du | original data: the output hysteresis voltage value of the accelerometer at 90° | V(volt) |
| Huanzhi180du | original data: the output hysteresis voltage value of the accelerometer at 180° | V(volt) |
| Huanzhi270du | original data: the output hysteresis voltage value of the accelerometer at 270° | V(volt) |

In Step S20, the original data is preprocessed according to the time series algorithm to obtain the characteristic columns and filter the characteristic columns, that is, remove the useless columns to retain the useful columns (in the table, the characteristic titles with lag at their ends are newly generated characteristic columns).

K0uglag, K1 mA.glag, K2ug.g2lag and K3uradla in the above figure are K0ug, K1mA.g, K2ug.g2, and K3urad based on the measured data, and the lag function (an autocorrelation analysis function) is used to generate the autocorrelation results. The calculation method is to put the value at the last time at the current time, as a variable (parameter) for calculating the K0 value at the current time. IDorder and diffDays are calculated based on actual calibration dates. DiffDays is the number of days from the current calibration to the last time of calibration, and IDorder is the number of days from the current calibration to the first time of calibration (on Feb. 8, 2022). The obtained analysis results of strong autocorrelation are as follows: the autocorrelations of K0, K1, K2, and δ are 77.9%, 65.6%, 18.3%, and 86.6%, respectively, and therefore K0, K1, and δ have a strong autocorrelation.

What is claimed is:

1. A method for improving the calibration efficiency of an accelerometer, comprising the following steps:
    S100: obtaining original data of the quartz flexible accelerometer at a plurality of time nodes;
    S200: establishing a linear regression model according to the original data, wherein characteristic variables of the linear regression model at least include IDorder and Vni270du, IDorder is the number of days from a current target time node to a reference time node, and Vni270du is the original data generated in calibration tests of the quartz accelerometer; and
    S300: forward predicting predicted values of performance parameters of the quartz flexible accelerometer at a plurality of target time nodes according to the linear regression model.

2. The method for improving the calibration efficiency of an accelerometer according to claim 1, wherein Step S300 comprises the following steps:
    S310: obtaining original data of the quartz flexible accelerometer at one current time node as variable values of the linear regression;
    S320: in combination with the linear regression model, forward predicting the predicted values of the performance parameters of the quartz flexible accelerometer at a target time node; and
    S330: cycling Steps S310 and S320 for the plurality of the target time nodes.

3. The method for improving the calibration efficiency of an accelerometer according to claim 2, wherein Step S300 further comprises the following steps:
    obtaining measured values of performance parameters at a plurality of time nodes in Step S100, and obtaining measured standard deviation of the performance parameters by calculation;
    obtaining data of the performance parameters at the plurality of time nodes in Step S300, and obtaining predicted standard deviation of the performance parameters by calculation; and
    contrastively analyzing the measured standard deviation and the predicted standard deviation; and if difference between them is at or above a first set value, in Step S320, reducing the number of days between adjacent time nodes, and/or reducing the number of times of prediction in Step S320.

4. The according to claim 1, wherein the following step is further comprised prior to Step S300: verifying accuracy of the linear regression model, which specifically comprises the following steps:
    according to original data at various time nodes in Step S100, obtaining measured values of performance parameters at various time nodes in Step S100 by calculation, and obtaining a measured square root of the performance parameters by calculation;
    in combination with the linear regression model and the original data at various time nodes in Step S100, obtaining predicted values of the performance parameters at various time nodes in Step S100 by calculation, and obtaining a predicted square root of the performance parameters by calculation; and
    contrastively analyzing the measured square root and the predicted square root; and if difference between them is at or below a second set value, proceeding to Step S300.

5. The method for improving the calibration efficiency of an accelerometer according to claim 1, wherein Step S200 comprises the following steps:
    preprocessing the original data according to a time series algorithm to obtain new characteristic variables;
    eliminating a part of characteristic variables based on a stepAIC function in R language; and
    establishing the linear regression model based on a multiple linear regression algorithm.

6. The method for improving the calibration efficiency of an accelerometer according to claim 5, wherein Step S200 further comprises the following step: eliminating the characteristic variables with multicollinearity according to a correlation matrix.

7. The method for improving the calibration efficiency of an accelerometer according to claim 1, further comprising the following steps:
- determining autocorrelation of various performance parameters of the quartz flexible accelerometer, and if the autocorrelation of the performance parameters is greater than a third set value, prediction requirements being met;
- wherein in Step S300, predicted values of the performance parameters meeting the requirements are forward predicted according to the linear regression model.

8. The method for improving the calibration efficiency of an accelerometer according to claim 7, prior to determining the autocorrelation of various performance parameters of the quartz flexible accelerometer, further comprising the following steps:
- obtaining original data of the quartz flexible accelerometer;
- preprocessing the original data according to the time series algorithm, obtaining characteristic columns, and filtering the characteristic columns; and
- obtaining autocorrelation data of various performance parameters by calculation, in combination with an autocorrelation analysis function.

* * * * *